United States Patent
Kawai

(10) Patent No.: US 11,922,933 B2
(45) Date of Patent: Mar. 5, 2024

(54) VOICE PROCESSING DEVICE AND VOICE PROCESSING METHOD

(71) Applicant: YAMAHA CORPORATION, Hamamatsu (JP)

(72) Inventor: Tetsuto Kawai, Aichi (JP)

(73) Assignee: YAMAHA CORPORATION, Hamamatsu (JP)

(*) Notice: Subject to any disclaimer, the term of this patent is extended or adjusted under 35 U.S.C. 154(b) by 0 days.

(21) Appl. No.: 16/889,965

(22) Filed: Jun. 2, 2020

(65) Prior Publication Data

US 2020/0388275 A1 Dec. 10, 2020

(30) Foreign Application Priority Data

Jun. 7, 2019 (JP) .................................. 2019-106859

(51) Int. Cl.
| | |
|---|---|
| G10L 25/78 | (2013.01) |
| G06F 17/18 | (2006.01) |
| G10L 15/16 | (2006.01) |
| G10L 15/20 | (2006.01) |
| G10L 25/24 | (2013.01) |

(52) U.S. Cl.
CPC .............. G10L 15/20 (2013.01); G06F 17/18 (2013.01); G10L 15/16 (2013.01); G10L 25/24 (2013.01); G10L 25/78 (2013.01)

(58) Field of Classification Search
CPC .......... G10L 25/78; G10L 15/20; G10L 25/24
See application file for complete search history.

(56) References Cited

U.S. PATENT DOCUMENTS

| | | | | |
|---|---|---|---|---|
| 5,355,431 A | * | 10/1994 | Kane ....................... | G10L 15/20 704/226 |
| 5,630,015 A | * | 5/1997 | Kane ....................... | G10L 15/20 704/226 |
| 6,084,967 A | * | 7/2000 | Kennedy ............... | H04W 12/06 380/247 |
| 7,555,432 B1 | * | 6/2009 | Gopalan ............... | G10L 19/018 380/252 |

(Continued)

FOREIGN PATENT DOCUMENTS

| | | |
|---|---|---|
| EP | 2083417 A2 | 7/2009 |
| JP | 2009175473 A | 8/2009 |

(Continued)

OTHER PUBLICATIONS

Gerkmann, T., Krawczyk, M., & Martin, R. (Mar. 2010). Speech presence probability estimation based on temporal cepstrum smoothing. In 2010 IEEE International Conference on Acoustics, Speech and Signal Processing (pp. 4254-4257). IEEE.*

(Continued)

Primary Examiner — Bryan S Blankenagel
(74) Attorney, Agent, or Firm — ROSSI, KIMMS & McDOWELL LLP

(57) ABSTRACT

Voice processing method and device includes obtaining a probability value of an audio signal representing sound, collected by a first microphone on a near-end side, including a person's voice, determining a gain of the audio signal based on the determined probability value, processing the audio signal based on the determined gain of the audio signal, and sending the processed audio signal to a far-end side.

12 Claims, 11 Drawing Sheets

(56) References Cited

U.S. PATENT DOCUMENTS

| | | | |
|---|---|---|---|
| 9,516,442 B1* | 12/2016 | Dusan | H04R 1/1016 |
| 11,164,592 B1* | 11/2021 | Wu | G10L 21/034 |
| 2005/0192795 A1* | 9/2005 | Lam | G10L 25/78 |
| | | | 704/201 |
| 2006/0206326 A1* | 9/2006 | Fukada | G10L 15/187 |
| | | | 704/E15.044 |
| 2009/0089053 A1 | 4/2009 | Wang | |
| 2009/0192788 A1* | 7/2009 | Yoshioka | G10L 25/78 |
| | | | 704/206 |
| 2011/0182439 A1* | 7/2011 | Sakurada | H04R 3/02 |
| | | | 381/94.1 |
| 2012/0170760 A1* | 7/2012 | Virolainen | G10L 19/008 |
| | | | 381/56 |
| 2014/0358552 A1* | 12/2014 | Xu | G06F 1/3215 |
| | | | 704/275 |
| 2015/0156592 A1* | 6/2015 | Jensen | H04R 25/407 |
| | | | 381/23.1 |
| 2015/0215467 A1* | 7/2015 | Shue | G10L 21/0264 |
| | | | 704/225 |
| 2015/0325253 A1 | 11/2015 | Matsuo | |
| 2018/0077278 A1* | 3/2018 | Fujieda | H04M 3/002 |
| 2018/0152795 A1* | 5/2018 | Lee | H04R 1/1041 |
| 2019/0267022 A1* | 8/2019 | Lombard | G10L 21/0208 |
| 2019/0355373 A1* | 11/2019 | Nesta | G10L 21/028 |
| 2020/0029153 A1* | 1/2020 | Seo | H04R 1/406 |
| 2020/0154202 A1* | 5/2020 | Raja Gunaseela Boopathy | G10L 21/0232 |
| 2020/0294508 A1* | 9/2020 | Kwasiborski | G06F 21/32 |
| 2021/0058720 A1* | 2/2021 | Brown | H04R 25/606 |
| 2021/0132895 A1* | 5/2021 | Cengarle | G10L 25/06 |

FOREIGN PATENT DOCUMENTS

| | | |
|---|---|---|
| JP | 2010541010 A | 12/2010 |
| JP | 2015215463 A | 12/2015 |
| JP | 2016085420 A | 5/2016 |

OTHER PUBLICATIONS

Extended European Search Report issued in European Appln. No. 20177961.8 dated Oct. 30, 2020.

Office Action issued Japanese Appln. No. 2019-106859 dated Jan. 31, 2023. English machine translation provided.

Obuchi et al. "Voice activity detection under noisy environment based on augmented execution of statistical noise suppression", Information Processing Society of Japan Technical Report. Dec. 21, 2012: pp. 1-6. vol. 2012- SLP-94, No. 18. English abstract provided.

Office Action issued in Chinese Appln. No. 202010493978.1 dated May 19, 2023. English translation provided.

Office Action issued in Japanese Appln. No. 2019-106859 dated Jul. 11, 2023. English translation provided.

* cited by examiner

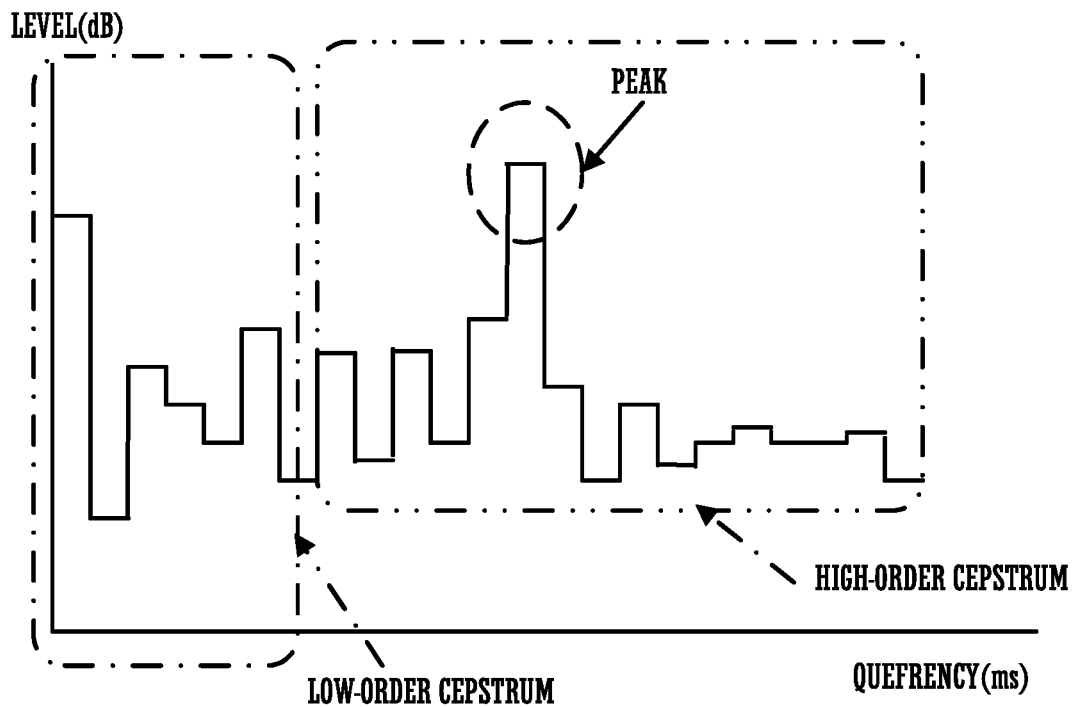
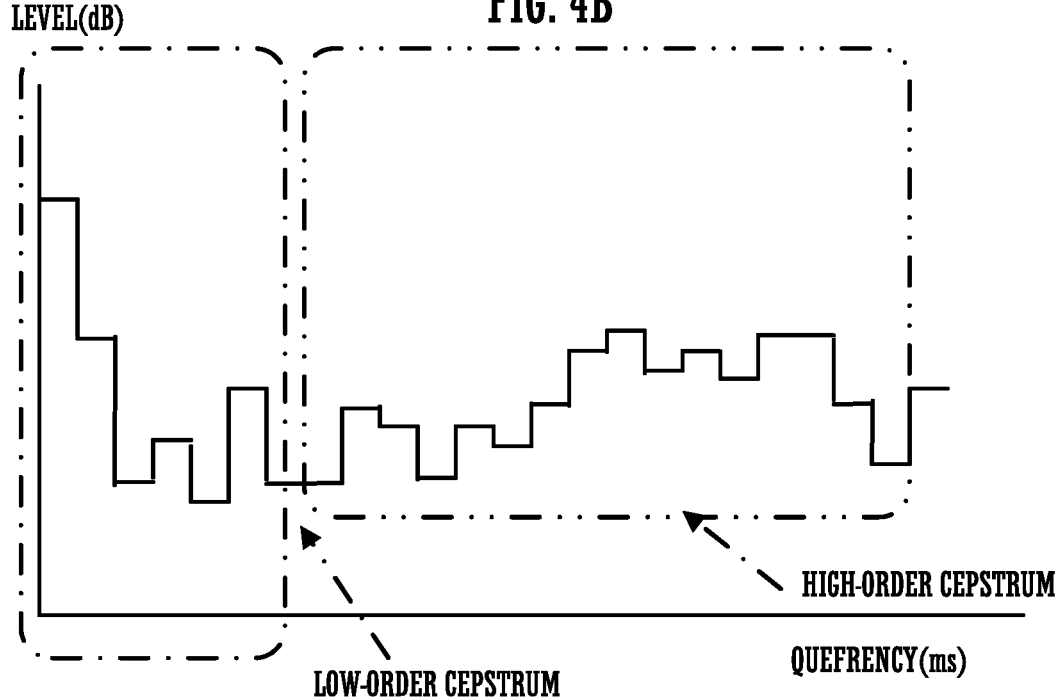

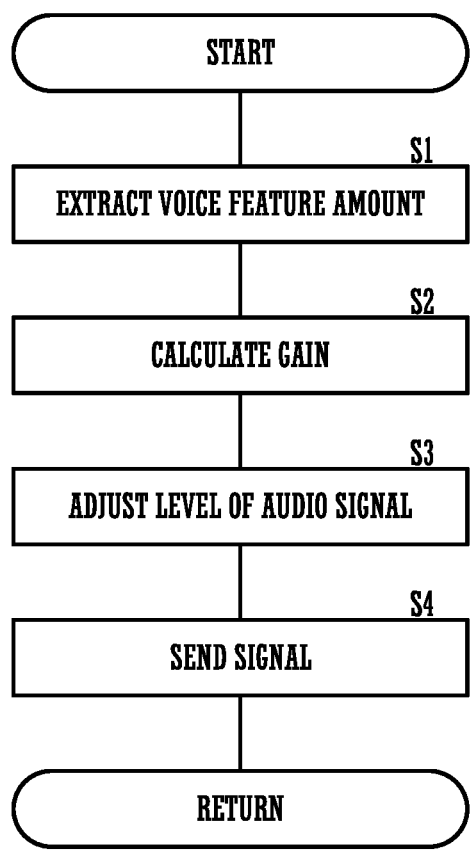

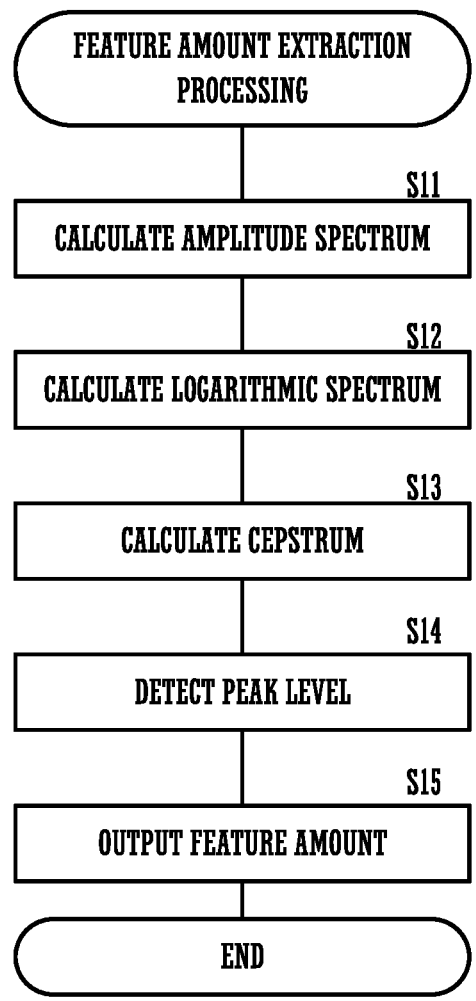

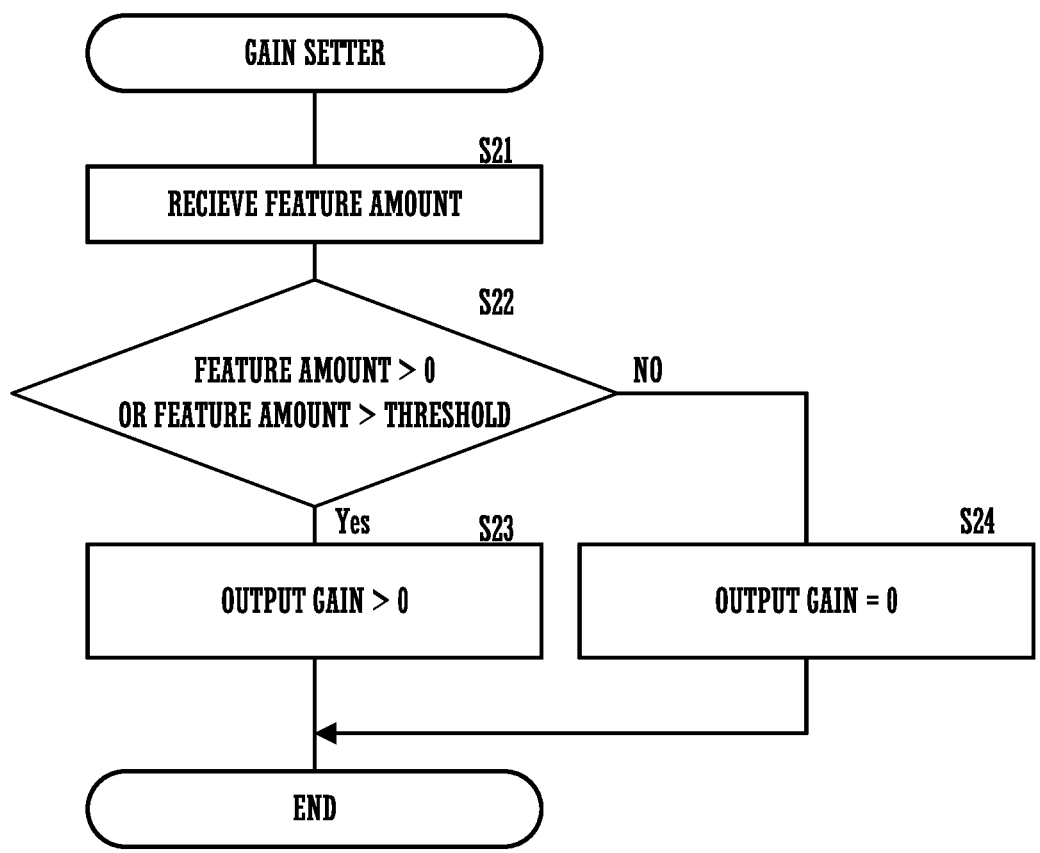

VOICE PROCESSING DEVICE AND VOICE PROCESSING METHOD

CROSS REFERENCE TO RELATED APPLICATIONS

This Nonprovisional application claims priority under 35 U.S.C. § 119(a) on Patent Application No. 2019-106859 filed in Japan on Jun. 7, 2019, the entire contents of which are hereby incorporated by reference.

BACKGROUND

1. Technical Field

A preferred embodiment of the present invention relates to signal processing of an audio signal.

2. Description of the Related Art

Conventionally, a voice adjustment device distinguishes whether an audio signal is voice or noise by measuring a strength of a level of an audio signal inputted from a microphone and comparing the strength of the level of the audio signal with a preset voice strength threshold (see Japanese Unexamined Patent Application Publication No. 2016-85420, for example). The voice adjustment device determines that an audio signal that lasts longer than any fixed time period (5 to 10 seconds) in a state (a voiced state) in which the strength is greater than a predetermined voice strength threshold is not human voice but the surrounding noise. In addition, the voice adjustment device determines that an audio signal that lasts longer than a fixed time period (20 to 30 seconds) in a state (an unvoiced state) in which the strength is smaller than a threshold does not include the surrounding noise.

However, the conventional voice adjustment device does not consider sending voice of a talker on a near-end side, using the voice adjustment device, to a far-end side, at an appropriate level, with respect to a different voice adjustment device or a device that has a speaker that are disposed at a distant position (on a far-end side).

SUMMARY

A preferred embodiment of the present invention is directed to voice processing method and device for sending voice of a talker on a near-end side, at an appropriate level, to a far-end side.

A voice processing method according to a preferred embodiment of the present invention includes obtaining a probability value of an audio signal representing sound, collected by a first microphone on a near-end side, including a person's voice, determining a gain of the audio signal based on the determined probability value, processing the audio signal based on the determined gain of the audio signal, and sending the processed audio signal to a far-end side. The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A and FIG. 4B are examples of a cepstrum waveform according to the first preferred embodiment, FIG. 4A is a diagram showing a waveform when an audio signal includes voice, and FIG. 4B is a diagram showing a waveform when an audio signal does not include voice.

FIG. 5 is a flow chart showing an example of an operation of the voice processing device according to the first preferred embodiment.

FIG. 6 is a flow chart showing an example of processing of extracting a feature amount, using a cepstrum according to the first preferred embodiment.

FIG. 7 is a flow chart showing an example of an operation of a gain determiner according to the first preferred embodiment.

DETAILED DESCRIPTION OF THE PREFERRED EMBODIMENTS

First Preferred Embodiment

Figure 1:
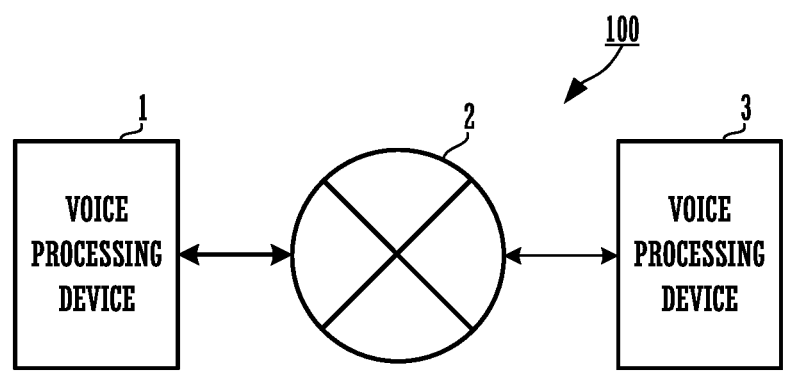
FIG. 1 is a diagram showing a configuration of a voice processing system according to a first preferred embodiment of the present invention.

FIG. 1 is a diagram showing a configuration of a voice processing system 100 according to a first preferred embodiment of the present invention. The voice processing system 100 includes a plurality (two in FIG. 1) of voice processing devices 1 and 3 that are connected to each other through a network 2.

The voice processing device 1 is installed at a first point. The voice processing device 3 is installed at a second point. In other words, the voice processing device 1 and the voice processing device 3 are installed at places distant from each other.

The voice processing device 1 and the voice processing device 3 are used for a conference system at a distant place, for example. The voice processing device 1 sends voice of a user using the voice processing device 1 to the voice processing device 3 through the network 2, for example. In addition, similarly, voice of a user using the voice processing device 3 is also sent to the voice processing device 1 through the network 2.

The voice processing device 1 and the voice processing device 3 have the same configurations and the same functions. In addition, in the following description, a user using the voice processing device 1 is referred to as a user or a talker on a near-end side. In addition, in the following description, a user using the voice processing device 3 is referred to as a user or a listener on a far-end side. Furthermore, in the following description, an example of sending voice of a talker using the voice processing device 1 to the voice processing device 3 through the network 2 will be described.

It is to be noted that the following description of the preferred embodiments is an example and the present invention is not limited to the following examples.

Figure 2:
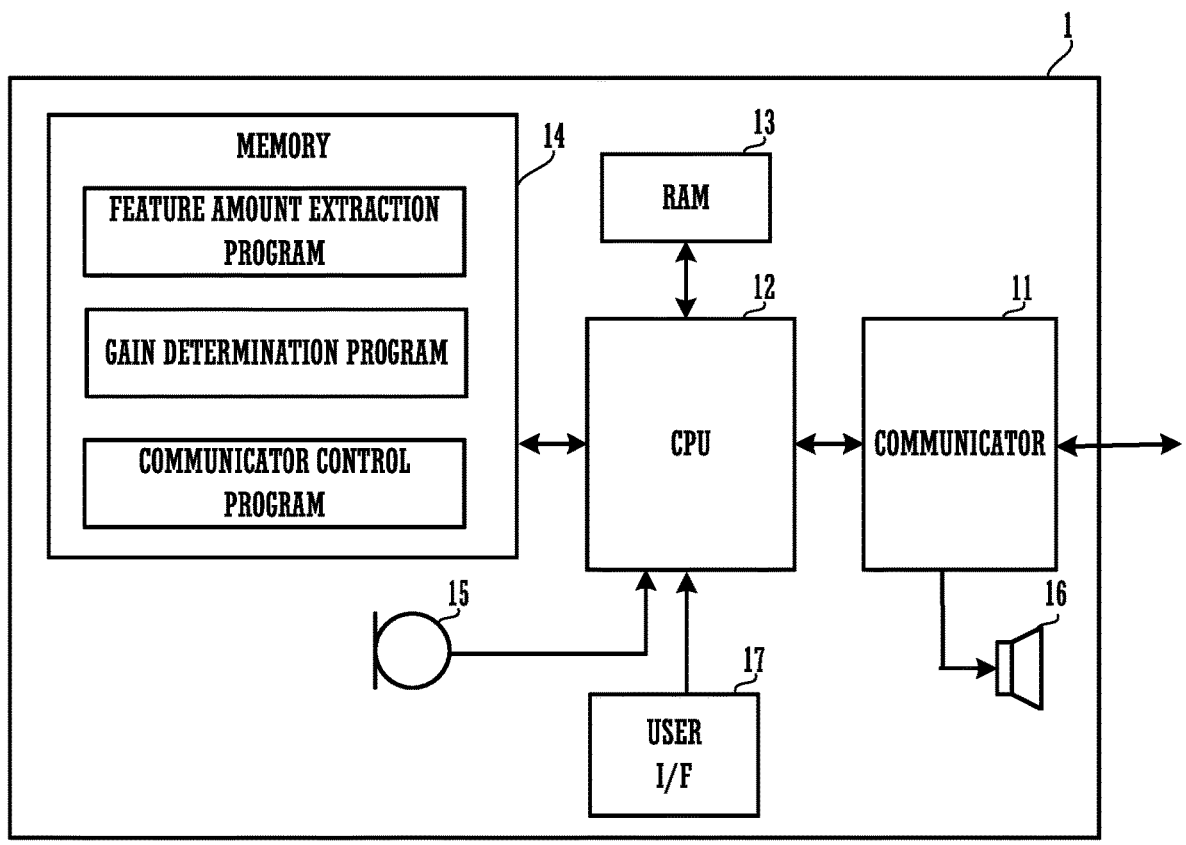
FIG. 2 is a block diagram showing a main configuration of a voice processing device according to the first preferred embodiment.

FIG. 2 is a block diagram showing a main configuration of the voice processing device 1. The voice processing device 1, as shown in FIG. 2, includes a communicator 11, a CPU 12, a RAM 13, a memory 14, a microphone 15, a speaker 16, and a user interface (I/F) 17. The communicator 11 in the example corresponds to a sender of the present invention. It is to be noted that the voice processing device 3 has the same configurations and the same functions as the voice processing device 1, so that the description will be omitted.

The CPU 12 reads programs from the memory 14 being a storage medium and temporarily stores the programs in the RAM 13, and thus performs various operations.

The memory 14 includes a flash memory or a hard disk drive (HDD). The memory 14 stores programs for operating the CPU 12 as described above. The memory 14 stores a feature amount extraction program, a gain determination program, and a communication control program. The feature amount extraction program is a program to configure a voice feature amount extractor 121 to be described below. The gain determination program is a program to configure a gain determiner 122 to be described below. The communication control program is a program to control the communicator 11 to be described below.

The microphone 15 collects sound of an audio signal including voice of a talker and the surrounding noise. The microphone 15 digitizes the audio signal (sound including the voice of a talker and the surrounding noise) of the collected sound. The microphone 15 outputs the digitally converted audio signal to the CPU 12.

The CPU 12 performs signal processing on the audio signal inputted from the microphone 15. The CPU 12 outputs the audio signal on which the signal processing has been performed, to the communicator 11. It is to be noted that the voice processing device 1 may include a processor (DSP: Digital Signal Processor) exclusively used for signal processing. In such a case, according to instructions of the CPU 12, the DSP performs signal processing.

The CPU 12, as the signal processing, obtains a probability (reliability of human voice) of voice of a talker from the audio signal according to sound collected by the microphone 15. The CPU 12, based on the probability of voice, performs signal processing on an audio signal so that voice on a near-end side may be easier to be heard for a listener on a far-end side. It is to be noted that the details of the signal processing will be described below. It is to be noted that the probability of voice in this example may be a value of 0 to 100 or a value of 0 to 1, or may be obtained based on a degree in comparison with a predetermined reference.

The user I/F 17 accepts an operation from a user. The operation to be accepts from the user includes adjustment of the volume of the speaker 16, for example.

The communicator 11 sends the audio signal on which the signal processing has been performed by the CPU 12, to the voice processing device 3 on a far-end side, through the network 2 (see FIG. 1). In addition, the communicator 11 receives an audio signal on a far-end side from the voice processing device 3, and outputs the audio signal to the speaker 16.

The speaker 16 emits sound (voice of a user) according to the audio signal on the far-end side that the communicator 11 has outputted. In addition, the speaker 16, in a case in which the inputted audio signal is a digital signal, may be configured to perform D/A conversion and then emit sound according to the audio signal.

Figure 3:
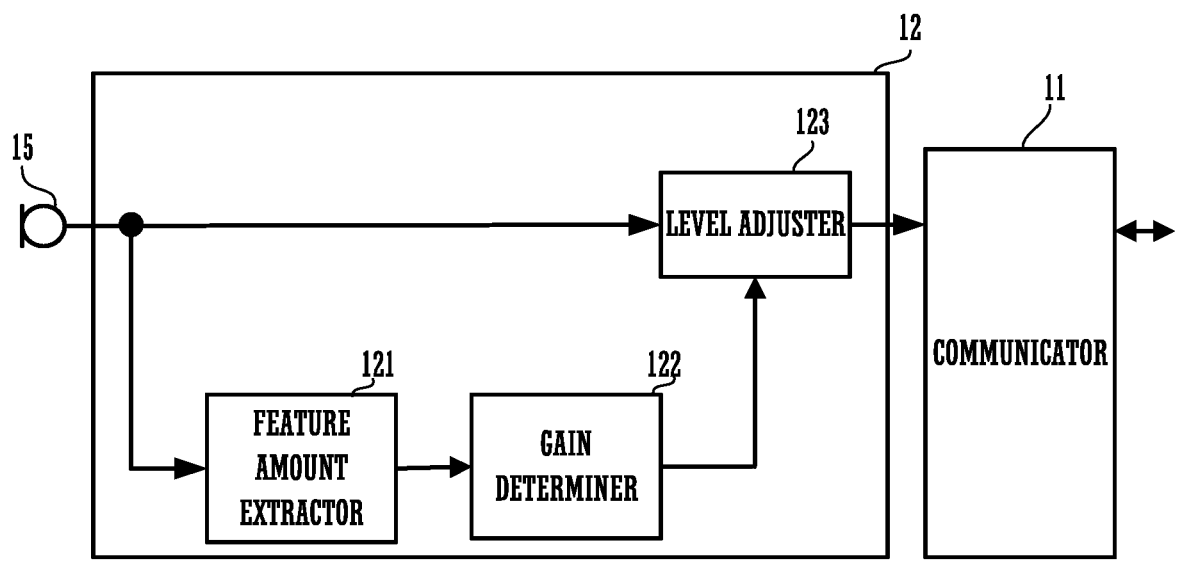
FIG. 3 is a block diagram showing a functional configuration of the voice processing device according to the first preferred embodiment.

The detailed functions and operations of the CPU 12 will be described with reference to FIG. 3. FIG. 3 is a block diagram showing a functional configuration of the voice processing device 1. The CPU 12 adjusts voice collected by the microphone 15 to an appropriate level, and outputs the voice to the communicator 11.

The CPU 12, as shown in FIG. 3, includes a feature amount extractor 121, a gain determiner 122, and a level adjuster 123. The feature amount extractor 121 in the example corresponds to a voice estimator of the present invention.

The feature amount extractor 121 extracts a voice feature amount from an audio signal according to sound collected by the microphone 15, as the probability of voice. More specifically, the feature amount extractor 121 extracts a voice feature amount, for example, using a cepstrum.

FIG. 4A is a diagram showing of an example of a cepstrum waveform, the example showing that an audio signal includes voice. FIG. 4B is a diagram showing of an example of a cepstrum waveform, the example showing that an audio signal does not include voice. The vertical axis of FIG. 4A and FIG. 4B represents a level (dB). In addition, the horizontal axis of FIG. 4A and FIG. 4B represents a quefrency (ms). It is to be noted that FIG. 4A and FIG. 4B show an enlarged low quefrency element.

The feature amount extractor 121, as shown in FIG. 4A, uses a lifter (a filter to be used for a cepstrum), for example, and separates a low-order cepstrum surrounded by a dashed-dotted line shown in FIG. 4A and a high-order cepstrum surrounded by a two-dot chain line shown FIG. 4A. Herein, the low-order cepstrum corresponds to an envelope element of a spectrum. In addition, the high-order cepstrum corresponds to fine element of a spectrum.

The voice is composed of a fundamental tone and a harmonic tone. The fundamental tone of the voice appears as the peak of the high-order cepstrum. In other words, the feature amount extractor 121, in a case of detecting the peak in the high-order cepstrum, estimates a high probability that the audio signal according to sound collected by the microphone 15 is voice. In the example, the feature amount extractor 121, in the case of detecting the peak in the high-order cepstrum, converts (normalizes) a peak level into a value of 0 to 1, and outputs the value to the gain determiner 122 as a feature amount.

On the other hand, the feature amount extractor 121, as shown in FIG. 4B, in a case of detecting no peak in the high-order cepstrum, estimates that the probability of voice is low. The feature amount extractor 121 outputs that no peak is in the high-order cepstrum (that a feature amount is set to 0) to the gain determiner 122.

The gain determiner 122 determines a gain of the audio signal according to sound collected by the microphone 15, based on the feature amount (the value of 0 to 1) extracted by the feature amount extractor 121. The gain determiner 122, in a case in which the feature amount is 0 to 1 (0<feature amount≤1), for example, determines a gain to be a value greater than 0 (a minimum value). In addition, the gain determiner 122, in a case in which the extracted feature amount is 0, determines a gain to be 0 (the minimum value).

It is to be noted that the gain determiner 122 may determine a gain to be from 0 to 1, according to the received feature amount. In addition, the gain determiner 122 may previously determine a threshold value, compare the received feature amount with the threshold value, and determine a gain. In such a case, for example, the gain determiner 122 determines a gain to be 0 when the feature amount is less than or equal to the threshold value. In addition, in such a case, for example, when the feature amount exceeds the threshold value, a gain is determined to be 0 to 1 (0<gain≤1).

The level adjuster 123 adjusts the level of the audio signal according to sound collected by the microphone 15, using the gain determined by the gain determiner 122.

The voice processing device 1, when the probability (the feature amount) that the audio signal according to sound collected by the microphone 15 is voice is high, determines a gain to be 1 or between 0 and 1 (0<gain<1) according to the probability. In addition, when the probability that the audio signal according to sound collected by the microphone 15 is voice is low, a gain is determined to be 0. Accordingly, the voice processing device 1 is able to reduce unnecessary noise on the near-end side. Therefore, a listener on the far-end side can listen to the voice of a talker on the near-end side, at an appropriate level.

The operation of the voice processing device 1 will be described with reference to FIG. 5. FIG. 5 is a flow chart showing an example of the operation of the voice processing device 1.

The feature amount extractor 121 extracts a voice feature amount from an audio signal according to sound collected by the microphone 15, as a probability of voice (S1). The gain determiner 122 determines a gain of the audio signal according to sound collected by the microphone 15, based on the voice feature amount (S2). The level adjuster 123 adjusts a level of the audio signal, using the determined gain (S3). The communicator 11 sends the processed signal, to a far end side (S4).

Next, an example of processing of extracting a feature amount by the feature amount extractor 121 will be described with reference to FIG. 6. FIG. 6 is a flow chart showing an example of processing of extracting a feature amount using a cepstrum.

First, the feature amount extractor 121 performs FFT (Fast Furies Transform) (fast Fourier transform processing) on an audio signal according to sound collected by the microphone 15, and calculates an absolute value of the signal on which the FFT has been performed. As a result, the feature amount extractor 121 calculates an amplitude spectrum of the audio signal (S11). Next, the feature amount extractor 121 performs logarithm calculation (Log calculation) of the amplitude spectrum, and converts the amplitude spectrum into decibel (dB). Accordingly, the feature amount extractor 121 calculates a logarithmic spectrum (S12). Furthermore, the feature amount extractor 121 performs DCT (Discrete Cosine Transform) (discrete cosine transform processing) on the logarithmic spectrum. As a result, the feature amount extractor 121 calculates a cepstrum (a waveform) (S13). The feature amount extractor 121 detects a peak level of a high-order cepstrum from the calculated cepstrum waveform (S14). The feature amount extractor 121 outputs a feature amount obtained by normalizing the detected peak level, to the gain determiner 122 (S15).

It is to be noted that the feature amount extractor 121, in a case of having not detected a peak level in the high-order cepstrum, outputs a voice feature amount (the probability of voice) as 0 to the gain determiner 122.

Next, an example of the operation of the gain determiner 122 will be described with reference to FIG. 7. FIG. 7 is a flow chart showing an example of the operation of the gain determiner 122. It is to be noted that the following description is an example and is not limited to the example.

The gain determiner 122 receives a feature amount from the feature amount extractor 121 (S21). The gain determiner 122 determines a gain according to the received feature amount (S22). The gain determiner 122, when the received feature amount is 0 to 1 (0<feature amount≤1) or exceeds a predetermined threshold value (S22: Yes), determines a gain to be a value greater than 0, and outputs the value to the level adjuster 123 (S23).

On the other hand, the gain determiner 122, when the feature amount is 0 or the feature amount is less than the threshold value (S22: No), determines a gain to be 0, and outputs the gain to the level adjuster 123 (S24).

The voice processing device 1 according to the first preferred embodiment determines a gain, based on a probability (a voice feature amount) of voice obtained from the peak level of a cepstrum waveform. The voice processing device 1 is a gain determined based on the probability (the voice feature amount) of voice, and adjusts the level of the audio signal according to sound collected by the microphone 15. Accordingly, the voice processing device 1 according to the first embodiment is able to send the voice of a talker on a near-end side to a far-end side, at an appropriate level.

It is to be noted that the gain determiner 122, in a case in which the received feature amount is 1 or exceeds the predetermined threshold value, for example, may instantly increase a gain. In such a case, the voice processing device 1 causes the beginning of voice to be easily heard (an initial loss of voice is able to be reduced). In addition, the gain determiner 122, in a case in which the received feature amount is 0 or is less than or equal to the threshold value, may gradually reduce a gain as time passes. In such a case, the voice processing device 1 does not make a user feel uncomfortable because volume is not drastically reduced.

Second Preferred Embodiment

Figure 8:
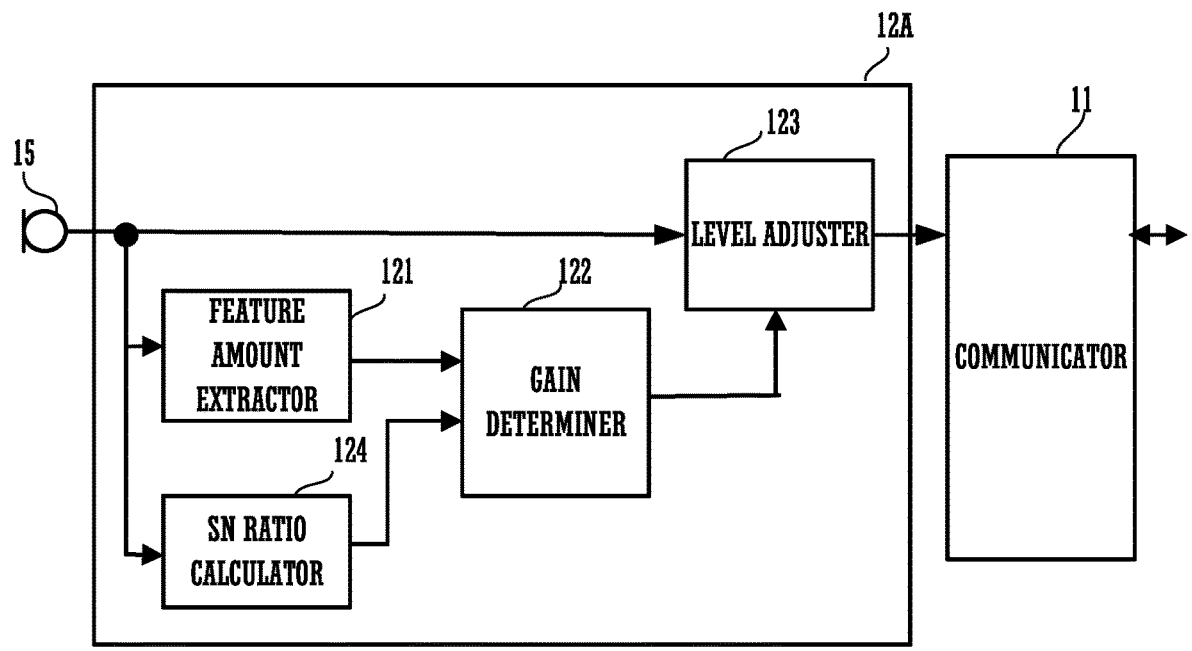
FIG. 8 is a block diagram showing a functional configuration of a voice processing device according to a second preferred embodiment of the present invention.

A CPU 12A of a voice processing device 1 and a voice processing device 3 according to a second embodiment of the present invention will be described with reference to FIG. 8. FIG. 8 is a block diagram showing a functional configuration of the CPU 12A according to the second preferred embodiment. It is to be noted that the same reference sign is given to the same configuration as the configuration of the CPU 12 according to the first preferred embodiment, and the description will be omitted. In addition, the voice processing devices 1 and 3 according to the second preferred embodiment have the same configurations and the same functions, and the CPU 12A of the voice processing device 1 will be described as a representative in the following description.

The CPU 12A according to the second preferred embodiment, as shown in FIG. 8, includes an SN (Signal to Noise) ratio calculator 124 that calculates an SN ratio of the surrounding noise with respect to an audio signal according to sound collected by the microphone 15. In other words, the CPU 12A reads a program and executes an SN ratio calculation program.

The SN ratio calculator 124 calculates an SN ratio between an audio signal and noise (sound except voice of a talker, such as typing sound, air-conditioning sound, and sound at a position distant from a device, for example). The SN ratio is calculated by the following equation 1, for example.

$$SN\ Ratio = \frac{P_S}{P_N} \qquad \text{Equation 1}$$

In Equation 1, PS indicates power level of an audio signal according to sound collected by the microphone 15. In addition, PN indicates power level of noise collected by the microphone 15. In such a case, the SN ratio calculator 124 previously calculates the power level of noise in a state in which a talker on the near-end side does not utter voice (does not talk), for example. The SN ratio calculator 124 calculates an SN ratio using the previously calculated power level of the noise and the power level of the audio signal according to the collected sound. A large SN ratio indicates that noise is quieter than voice. In addition, a small SN ratio indicates that noise is louder comparing with voice of the talker.

The gain determiner 122, for example, determines a gain according to a product of the SN ratio calculated by the SN ratio calculator 124 and the feature amount extracted by the feature amount extractor 121.

It is to be noted that the gain determiner 122 may compare the previously determined threshold value with the product by multiplication. In such a case, the gain determiner 122, when the product exceeds the threshold value, determines a gain to be 0 to 1 (0<gain≤1). In addition, the gain determiner 122, when the product is less than or equal to the threshold value, determines a gain to be 0.

In addition, the gain determiner 122 is not limited to the example of determining a gain according to the product of the feature amount of voice extracted by the feature amount extractor 121 and the SN ratio feature amount extractor calculated by the SN ratio calculator 124. The gain determiner 122 may determine a gain using a combination of the voice feature amount and the calculated SN ratio, with a logical expression such as a logical product, a logical sum, or an exclusive OR, or a plurality of logical expressions.

The voice processing device 1 according to the second preferred embodiment adjusts the level of an audio signal based on not only a probability (the voice feature amount) of voice by the feature amount extractor 121 of a talker on a near-end side but an SN ratio of an audio signal to noise. Accordingly, the voice processing device 1 is able to send the voice of the talker on the near-end side collected by the microphone 15 to a far-end side, at a better appropriate level.

It is to be noted that, in the voice processing device 1 according to the second preferred embodiment, although the example in which the CPU 12A reads and executes an SN ratio calculation program is described, the SN ratio calculator may be configured by an SN ratio calculation circuit.

Third Preferred Embodiment

Figure 9:
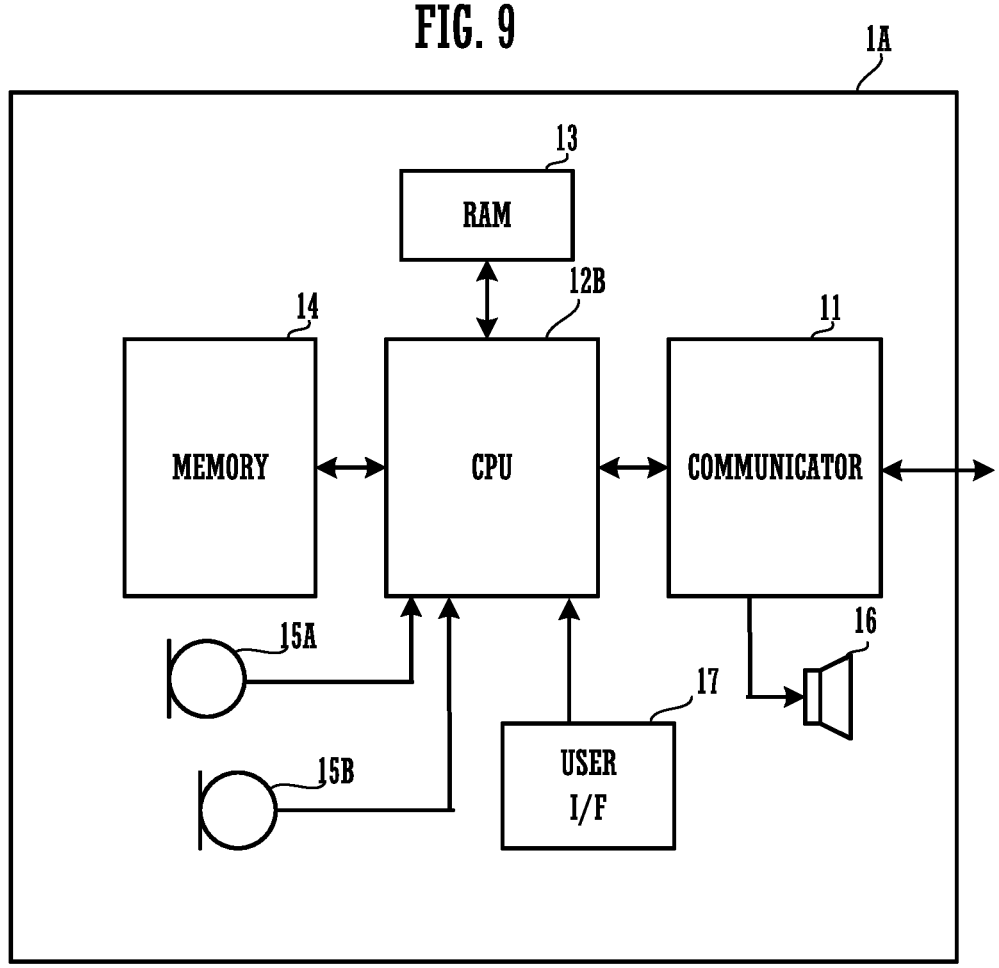
FIG. 9 is a block diagram showing a main configuration of a voice processing device according to a third preferred embodiment of the present invention.
Figure 10:
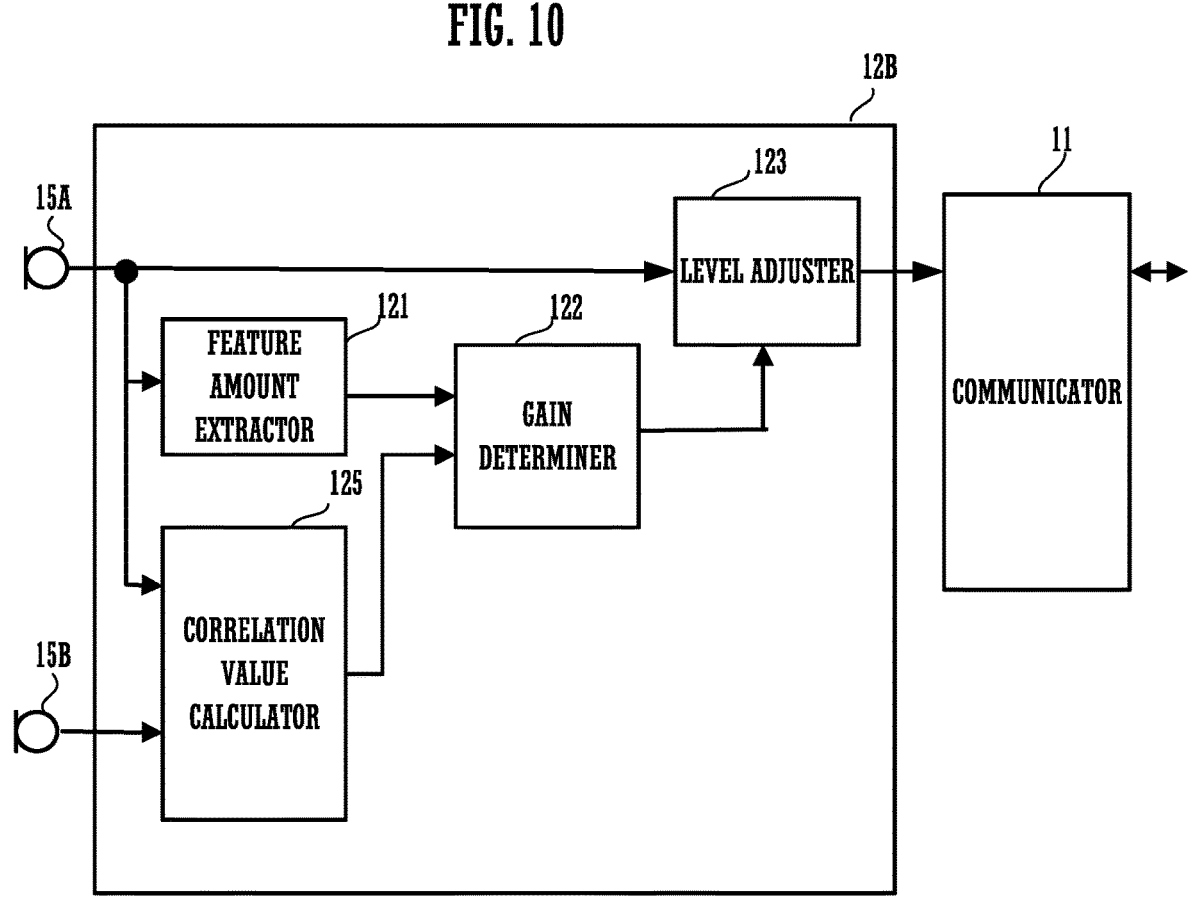
FIG. 10 is a block diagram showing a functional configuration of the voice processing device according to the third preferred embodiment.

A voice processing device 1A according to a third preferred embodiment of the present invention will be described with reference to FIG. 9. FIG. 9 is a block diagram showing a main configuration of the voice processing device 1A according to the third preferred embodiment. FIG. 10 is a block diagram showing a functional configuration of the CPU 12B of the voice processing device 1A according to the third preferred embodiment. It is to be noted that the voice processing device 3 has the same configurations and functions as the voice processing device 1A, so that the voice processing device 1A will be described as a representative in the following description. In addition, the same reference sign is given to the same configuration as the configuration of the voice processing device 1, and the description will be omitted.

The voice processing device 1A according to the third preferred embodiment, as shown in FIG. 9, includes a plurality (two in FIG. 9) of microphones 15A and 15B. The voice processing device 1A collects an audio signal according to sound on a near-end side from each of the microphone 15A and the microphone 15B.

Each of the microphone 15A and the microphone 15B outputs an audio signal to the CPU 12B.

The CPU 12B, as shown in FIG. 10, includes a correlation value calculator 125. The correlation value calculator 125 calculates a correlation of the audio signal according to sound collected by the plurality of microphone 15A and microphone 15B. The correlation value calculator 125 calculates a cross-power spectrum phase function.

The correlation value calculator 125 obtains a correlation between a spectrum of a first audio signal $S1(t)$ generated from the microphone 15A and a spectrum of a second audio signal $S2(t)$ generated from the microphone 15B.

It is to be noted that, in the following description, the microphone 15A is a directional microphone as an example. The microphone 15B is a non-directional microphone having uniform sensitivity in all directions. However, the directional aspect of the microphone 15A and the microphone 15B is not limited to this example. For example, both of the microphone 15A and the microphone 15B may be non-directional microphones or may be directional microphones. In addition, the number of microphones may not be limited to two, and the voice processing device 1A may include three or more microphones, for example.

The cross-power spectrum phase function is calculated by the following Equation 2 to Equation 6, for example. First, the correlation value calculator 125 performs the FFT on each of the first audio signal $S1(t)$ and the second audio signal $S2(t)$ according to the following Equation 2 and Equation 3. The correlation value calculator 125 converts the first audio signal $S1(t)$ and the second audio signal $S2(t)$ into a signal $S1(\omega)$ and a signal $S2(\omega)$ in a frequency domain.

$$S_1(\omega) = \int_{-\infty}^{\infty} s_1(t) e^{-j\omega t} \quad \text{Equation 2:}$$

$$S_2(\omega) = \int_{-\infty}^{\infty} s_2(t) e^{-j\omega t} dt \quad \text{Equation 3:}$$

Subsequently, the correlation value calculator 125 calculates a cross correlation function $S1,2(\omega)$ of the signal $S1(\omega)$ and the signal $S2(\omega)$ of the frequency domain.

$$S_{1,2}(\omega) = \frac{S_1(\omega) S_2(\omega)*}{|S_1(\omega)||S_2(\omega)|} \quad \text{Equation 4}$$

The symbol * in Equation 4 indicates a complex conjugate (obtained by multiplying an imaginary part of a complex number by negative one).

Furthermore, the correlation value calculator 125 performs IFFT (Inverse Fast Fourier Transfer (inverse Fourier transform)), for example, from the cross correlation function $S1, 2(\omega)$ calculated by Equation 4, and calculates a cross-power spectrum phase coefficient $CPS1, 2(\tau)$.

$$CPS_{1,2}(\tau) = \int_{-\infty}^{\infty} s_{1,2}(\omega) e^{-j\omega\tau} d\omega \quad \text{Equation 5:}$$

Furthermore, a time difference TDOA1, 2 of which the cross-power spectrum phase coefficient is the maximum is calculated from the cross-power spectrum phase coefficient $CPS1, 2(\tau)$.

$$TDOA_{1,2} = \text{argmax}(CSP_{1,2}(\tau)) \quad \text{Equation 6:}$$

The correlation value calculator 125, using Equation 2 to Equation 6, obtains a time difference (a phase difference) TDOA1, 2 of the waveform of a first audio signal and a second audio signal $S2(t)$. In a case in which the time difference TDOA1, 2 is large, the correlation value calculator 125 considers that a sound source is near the device, and distinguishes that voice from the sound source is voice of a talker on a near-end side. On the other hand, the correlation value calculator 125, in a case in which the time difference TDOA1, 2 is small, distinguishes that a large amount of indirect sound is made, which is noise from a distant sound source of the device.

The gain determiner 122 determines a gain of the audio signal according to sound collected using the product of the feature amount of voice extracted by the feature amount extractor 121 and a distinguished result distinguished by the correlation value calculator 125.

The correlation value calculator 125 of the voice processing device 1A according to the third preferred embodiment distinguishes whether an audio signal from a sound source is voice or distant noise, using the cross-power spectrum phase function. Accordingly, the voice processing device 1A according to the third preferred embodiment adjusts the level of an audio signal based on not only the probability (the voice feature amount) of voice of a talker on a near-end side but also whether or not noise is from a distant place. Accordingly, the voice processing device 1A is able to send the voice of the talker on the near-end side collected by the microphone 15 to a far-end side, at a more appropriate level.

It is to be noted that the gain determiner 122 is not limited to the example of determining a gain using the product of the probability (the voice feature amount) of voice and the distinguished result by the correlation value calculator 125. The gain determiner 122 may determine a gain by combining the probability (the voice feature amount) of voice and the distinguished result, for example, with a logical expression such as a logical product, a logical sum, or an exclusive OR, or a plurality of logical expressions, for example.

In addition, the voice processing device 1A according to the third preferred embodiment may be used in combination with the voice processing device 1 according to the second preferred embodiment. In such a case, for example, the gain determiner 122 determines a gain of the audio signal according to sound collected by the microphone 15, by the probability of voice+(plus) the SN ratio×(multiply) the distinguished result. As a result, the voice processing device 1A, with higher accuracy, is able to send the voice of the talker on the near-end side collected by the microphone 15 to a far-end side, at an appropriate level. It is to be noted that the gain determiner 122 may determine a gain by combining the probability (the voice feature amount) of voice, the SN ratio, and the distinguished result with a plurality of logical expressions such as a logical product, a logical sum, or an exclusive OR, for example.

In addition, in the voice processing device 1A according to the third preferred embodiment, although the example in which the CPU 12B reads and executes a correlation calculation program is described, the correlation value calculator 125 may be configured by a correlation calculation circuit.

(First Modification)

A feature amount extractor 121 of a voice processing device 1 according to a first modification will be described. The voice processing device 1, by machine learning, distinguishes whether or not an audio signal is the voice of a talker on a near-end side.

The voice processing device 1 causes a plurality of voice samples to be previously stored, for example. The voice processing device 1 calculates the feature amount of the plurality of voice samples, and patterns the feature amount of voice as a learning model. The voice processing device 1 compares the audio signal according to sound collected by the microphone 15 with the feature amount of a stored voice sample. The voice processing device 1 obtains the probability of voice by pattern matching between the feature amount of voice according to sound collected by the microphone 15 and the feature amount of the stored voice sample.

For example, the voice processing device 1 learns a voice feature amount and a noise feature amount, and patterns each feature amount as a voice model and a noise model. The voice processing device 1 receives an input of an unidentified audio signal (according to sound collected by a microphone), and distinguishes whether or not the audio signal is voice, based on a model that indicates a higher likelihood value.

The voice processing device 1 according to the first modification, by machine learning, obtains the probability of voice from the audio signal according to sound collected by the microphone 15. As a result, the voice processing device 1 according to the first modification, with a simpler method, is able to send the voice of the talker on the near-end side collected by the microphone 15 to a far-end side, at an appropriate level.

It is to be noted that the voice processing device 1 according to the first modification may obtain the probability of voice, using a neural network. In other words, the voice processing device 1 according to the first modification receives an input of the feature amount of an unidentified audio signal previously learned by the neural network, and distinguishes whether or not the audio signal is voice, based on an output result.

(Second Modification)

A feature amount extractor 121 of a voice processing device 1 according to a second modification will be described. The feature amount extractor 121 of the voice processing device 1 according to the second modification extracts a voice feature amount, depending on a frequency distribution of the fundamental tone and harmonic tone of an audio signal.

The feature amount extractor 121 performs the FFT on an audio signal according to sound collected by the microphone 15, for example. The feature amount extractor 121, when detecting the fundamental tone and the harmonic tone being an integral multiple of the fundamental tone, from the audio signal according to sound collected by the microphone 15, estimates that the sound is voice of a talker.

The voice processing device 1 according to the second modification is able to obtain (extract a voice feature amount) the probability of voice with a simpler method.

(Different Modifications)

Different modifications will be listed below.

A feature amount extractor 121 of a voice processing device 1 according to a different modification calculates power level (dB) in a frequency band. More specifically, the feature amount extractor 121 calculates power level by performing the FFT on an audio signal. The feature amount extractor 121 obtains the probability that the audio signal is voice, according to the power level of the audio signal according to sound collected by the microphone 15. In other words, the feature amount extractor 121 distinguishes whether or not the audio signal is voice according to the power level of the audio signal, according to sound collected by the microphone 15.

In addition, a feature amount extractor 121 of a voice processing device 1 according to another different modification extracts a voice feature amount by spectral flux method. Spectral flux indicates a local change in a voice spectrum. In other words, large spectral flux indicates a large variation in sound. In other words, the feature amount extractor 121 of the voice processing device 1, when the spectral flux is large, determines that a talker on the near-end side has talked.

In addition, a feature amount extractor 121 of a voice processing device 1 according to a further different modification extracts a voice feature amount, according to an aperiodicity index. The aperiodicity index indicates the ratio of a periodic element and aperiodic element of voice. The aperiodicity index is used to indicate sound in which the periodic element and the aperiodic element are mixed, as with a consonant of a hoarse voice. The feature amount extractor 121 according to the present modification calculates an aperiodicity index. In other words, the feature amount extractor 121 of the voice processing device 1, when detecting an aperiodicity index, distinguishes that a talker on the near-end side is talking.

In addition, a feature amount extractor 121 according to a different modification calculates the number of times the time waveform of an audio signal crosses zero, as the probability (the voice feature amount) of voice. The feature amount extractor 121 calculates the frequency of appearance of a point as zero crossing in a time domain of voice. The zero crossing corresponds to a pitch being the fundamental tone of voice. In other words, the feature amount extractor 121 of the voice processing device 1, when detecting the zero crossing, estimates that the probability of voice of a talker on the near-end side is high.

Figure 11:
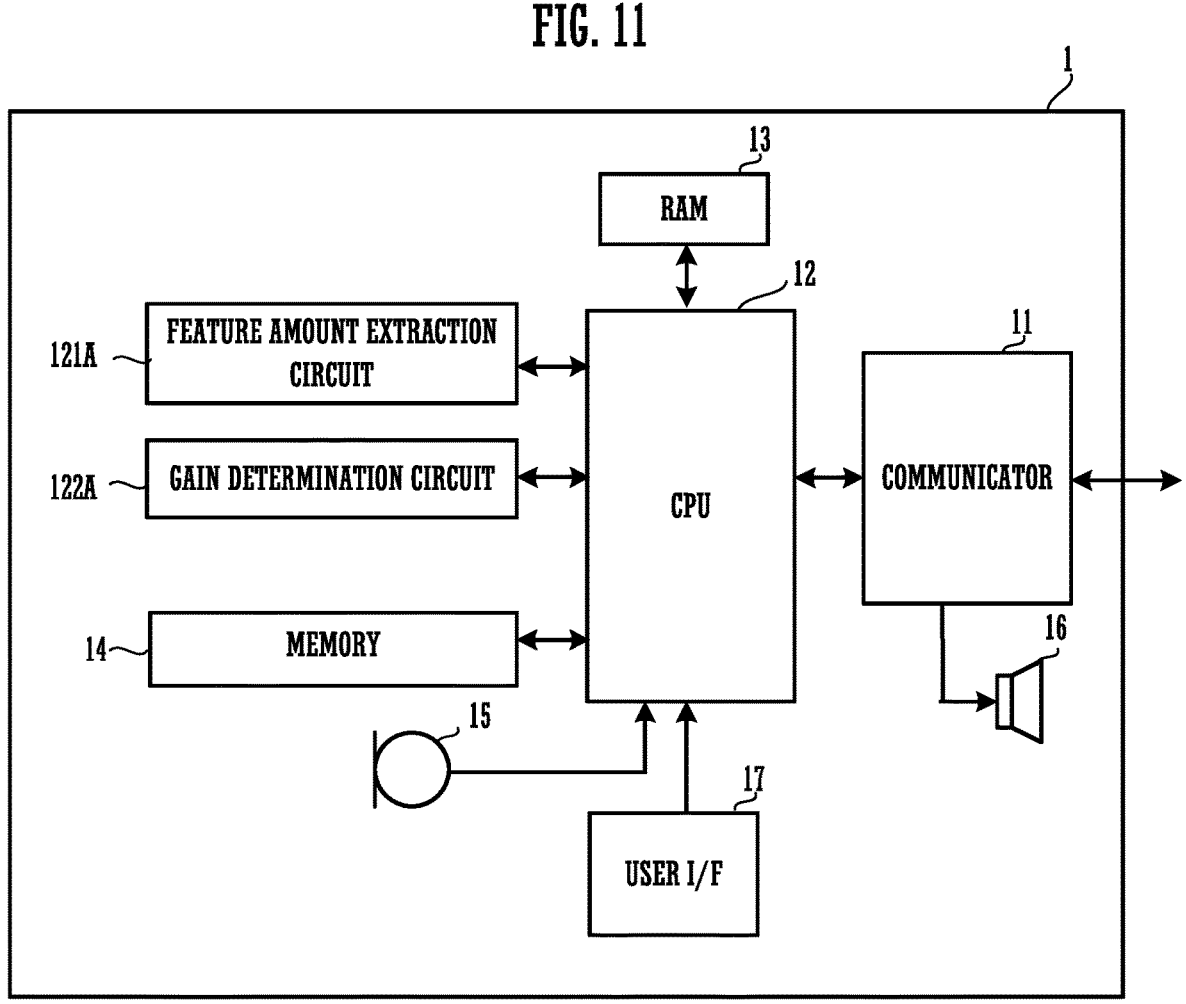
FIG. 11 is a block diagram showing a main hardware configuration of an acoustic device.

It is to be noted that all the configurations of the present invention may be achieved by hardware such as FGPA (Field-Programmable Gate Array). For example, as shown in FIG. 11, the voice processing device 1 or the voice processing device 1A and the feature amount extractor 121 may include a feature amount extraction circuit 121A corresponding to the feature amount extractor 121, and a gain determination circuit 122A corresponding to the gain determiner 122.

In addition, the CPU 12, the CPU 12A, or the CPU 12B may achieve the function of the hardware of the communicator 11 by reading and executing a communication control program stored in the memory 14 (refer to FIG. 2).

In addition, the configuration of the present invention may be achieved by appropriately combining hardware and software.

Finally, the descriptions of the foregoing present preferred embodiment and modification are illustrative in all points and should not be construed to limit the present invention. The scope of the present invention is defined not by the above described preferred embodiments and modifications but by the scope of claims for patent. Further, the scope of the present invention is intended to include all modifications within the scopes of the claims and within the meanings and scopes of equivalents.

What is claimed is:

1. A voice processing method comprising:
   collecting a first audio signal collected by a first microphone from a sound source and a second audio signal collected by a second microphone from the sound source;
   estimating probability of the first audio signal including a person's voice;
   setting a probability value to:
      a first probability value indicative of the first audio signal including a person's voice; and
      a second probability value of zero indicative of the first audio signal not including a person's voice;
   estimating a correlation value of the first audio signal and the second audio signal;
   obtaining a time difference between waveforms of the first audio signal and the second audio signal based on the estimated correlation value;
   determining that the first audio signal:
      includes a person's voice, in a state where the time difference is greater than a predetermined value; and
      does not include a person's voice, in a state where the time difference is not greater than the predetermined value;
   determining a gain of the first audio signal to be:
      from among a range of greater than zero and less than one, in a state where the first probability value is set and the time difference is greater than the predetermined value; and
      zero, in a state where the time difference is not greater than the predetermined value;
   processing the first audio signal based on the determined gain of the first audio signal to improve an audio quality at a far-end side; and
   sending the processed audio signal to the far-end side, where a voice processing device located at the far-end side reproduces the received processed audio signal to emit sound from a speaker.

2. The voice processing method according to claim 1, further comprising:
   estimating an audio signal-to-noise (SN) ratio in the first audio signal,
   wherein the determining determines the gain of the first audio signal to be from among the range of zero to one based on the estimated SN ratio, in the state where the first probability value is set and the time difference is greater than the predetermined value.

3. The voice processing method according to claim 1, wherein the processing gradually reduces or instantly increases the determined gain of the first audio signal.

4. The voice processing method according to claim 1, wherein the determining determines the gain of the first audio signal to be:
   a minimum, in the state where the second probability value, which is less than another predetermined value, is set; and
   a value greater than the minimum, in the state where the first probability value, which is greater than the another predetermined value, is set.

5. The voice processing method according to claim 1, wherein the probability value is set using machine learning.

6. A voice processing device comprising:
   a first microphone that collects a first audio signal from a sound source;
   a second microphone that collects a second audio signal from the sound source;
   a memory storing instructions; and
   a processor that implements the stored instructions to execute a plurality of tasks including:
      a voice estimating task that estimates probability of an audio signal collected by the first microphone including a person's voice;
      a probability value setting task that sets a probability value to:
         a first probability value indicative of the first audio signal including a person's voice; and
         a second probability value of zero indicative of the first audio signal not including a person's voice;
      a correlation value estimating task that estimates a correlation value of the first audio signal and the second audio signal;

a time-difference obtaining task that obtains a time difference between waveforms of the first audio signal and the second audio signal based on the estimated correlation value;

a voice determining task that determines that the first audio signal:
  includes a person's voice, in a state where the time difference is greater than a predetermined value; and
  does not include a person's voice, in a state where the time difference is not greater than the predetermined value;

a gain determining task that determines a gain of the first audio signal to be:
  from among a range of greater than zero and less than one, in a state where the first probability value is set and the time difference is greater than the predetermined value; and
  zero, in a state where the time difference is not greater than the predetermined value;

a signal processing task that processes the first audio signal based on the determined gain of the first audio signal to improve an audio quality at a far-end side; and a sending task that sends the processed audio signal to the far-end side, where a voice processing device located at the far-end side reproduces the received processed audio signal to emit sound from a speaker.

7. The voice processing device according to claim 6, wherein:
  the plurality of tasks include an audio signal-to-noise (SN) ratio estimating task that estimates an audio SN ratio in the first audio signal, and
  the gain determining task determines the gain of the first audio signal to be from among the range of zero to one based on the estimated SN ratio, in a state where the first probability value is set and the time difference is greater than the predetermined value.

8. The voice processing device according to claim 6, wherein the signal processing task gradually reduces or instantly increases the gain of the first audio signal.

9. The voice processing device according to claim 6, wherein the gain determining task determines the gain of the first audio signal to be:
  a minimum, in the state where the second probability value, which is less than another predetermined value, is set; and
  a value greater than the minimum, in the state where the first probability value, which is greater than the another predetermined value, is set.

10. The voice processing device according to claim 6, wherein the probability value setting task sets the probability value using machine learning.

11. A non-transitory computer-readable memory storing a program executable by a computer to execute a voice processing method comprising:
  collecting a first audio signal collected by a first microphone from a sound source and a second audio signal collected by a second microphone from the sound source;
  estimating a probability of the first audio signal including a person's voice;
  setting a probability value to:
    a first probability value indicative of the first audio signal including a person's voice; and
    a second probability value of zero indicative of the first audio signal not including a person's voice;
  estimating a correlation value of the first audio signal and the second audio signal;
  obtaining a time difference between waveforms of the first audio signal and the second audio signal based on the estimated correlation value;
  determining that the first audio signal:
    includes a person's voice, in a state where the time difference is greater than a predetermined value; and
    does not include a person's voice, in a state where the time difference is not greater than the predetermined value;
  determining a gain of the first audio signal to be:
    from among a range of greater than zero and less than one, in a state where the first probability value is set and the time difference is greater than the predetermined value; and
    zero, in a state where the time differences is not greater than the predetermined value;
  processing the first audio signal based on the determined gain of the first audio signal to improve an audio quality at a far-end side; and
  sending the processed audio signal to the far-end side, where a voice processing device located at the far-end side reproduces the received processed audio signal to emit sound from a speaker.

12. The non-transitory computer-readable memory according to claim 11, the method further comprising:
  estimating an audio signal-to-noise (SN) ratio in the first audio signal,
  wherein the determining determines the gain of the first audio signal to be from among the range of zero to one based on the estimated SN ratio, in the state where the first probability value is set and the time difference is greater than the predetermined value.

* * * * *